(12) United States Patent
Hudson et al.

(10) Patent No.: US 6,477,161 B1
(45) Date of Patent: Nov. 5, 2002

(54) DOWNLINK BEAMFORMING APPROACH FOR FREQUENCY DIVISION DUPLEX CELLULAR SYSTEMS

(75) Inventors: John Edward Hudson, Essex (GB); John Scott Thompson, Edinburgh (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/467,281

(22) Filed: Dec. 20, 1999

(30) Foreign Application Priority Data

Dec. 21, 1998 (GB) .............................................. 9828216

(51) Int. Cl.[7] .............................................. H04B 7/216
(52) U.S. Cl. ...................... 370/342; 370/281; 370/334; 370/319; 370/344; 455/562; 375/267
(58) Field of Search ................................. 370/281, 295, 370/326, 335, 342, 341, 328, 334, 319, 343, 344; 455/561, 562; 375/267

(56) References Cited

U.S. PATENT DOCUMENTS

| | | | | |
|---|---|---|---|---|
| 3,783,385 A | * | 1/1974 | Dunn et al. ................. | 375/267 |
| 4,128,809 A | * | 12/1978 | Kage .......................... | 375/347 |
| 4,884,272 A | * | 11/1989 | McConnell ................. | 375/341 |
| 5,745,858 A | * | 4/1998 | Sato et al. .................. | 455/138 |
| 5,930,305 A | * | 7/1999 | Leib ........................... | 329/304 |
| 2002/0018519 A1 | * | 2/2002 | Chiba ......................... | 375/149 |

FOREIGN PATENT DOCUMENTS

WO    WO 0191331 A2 * 11/2001 ............ H04B/7/08

OTHER PUBLICATIONS

"Smart Antenna Arrays for CDMA Systems" by Thompson, P Grant and B Mulgrew IEEE Personal Communications Magazine, vol. 3 (5) pp 16–25, Oct. 1996.
Efficient Signal Processing Technigues for Exploiting Transmit Antenna Diversity on Fading Channels, by G W Wornell and M D Trott, IEEE Trans Sig Proc, Jan. 1997, vol. 5 (1) pp 191–205.

* cited by examiner

Primary Examiner—Lee Nguyen
Assistant Examiner—Marcos L. Torres
(74) Attorney, Agent, or Firm—Lee, Mann, Smith, McWilliams, Sweeney & Ohlson (57) ABSTRACT

The present invention relates to radio communication antennas and in particular relates to multi-user detection for CDMA antenna array receivers. Here is provided a method of operating a FDD radio communications system wherein a base station has a constrained beamformer comprising at least two antennas with L channel taps and is operable to maximize diversity gain at the mobile. The total SNR of all the multipath components received at the mobile will be less than for the maximum SNR algorithm, but the diversity gain should outweigh this loss for (nearly) orthogonal channel taps. The performance of an uplink fixed weight beamformer is determined from the correlation matrix of the fadings of the uplink sampled impulse response. Computation techniques are simplified and processing time can be considerably reduced.

5 Claims, 8 Drawing Sheets

DOWNLINK BEAMFORMING APPROACH FOR FREQUENCY DIVISION DUPLEX CELLULAR SYSTEMS

FIELD OF THE INVENTION

The present invention relates to radio cellular mobile communications and relates to a downlink beamforming approach for frequency division duplex cellular systems. In particular, but not necessarily so restricted, the present invention relates to a downlink beamforming approach for code division multiple access (CDMA) systems.

BACKGROUND OF THE INVENTION

To cope with the increasing demand for cellular mobile communications it is necessary to find ways to increase system capacity on the downlink whilst avoiding system complexity.

The cellular mobile communications IS-95 standard describes the use of direct sequence code division multiple access (CDMA) techniques. In such systems, each user is allocated a distinct pseudo-noise (PN) code. The signal from each user is multiplied by a respective code before transmission to the base station. All users transmit using the same radio frequency carrier. The signals from different users will arrive asynchronously due to their different locations and signals from each user may arrive asynchronously due to multipath propagation.

Figure 1:
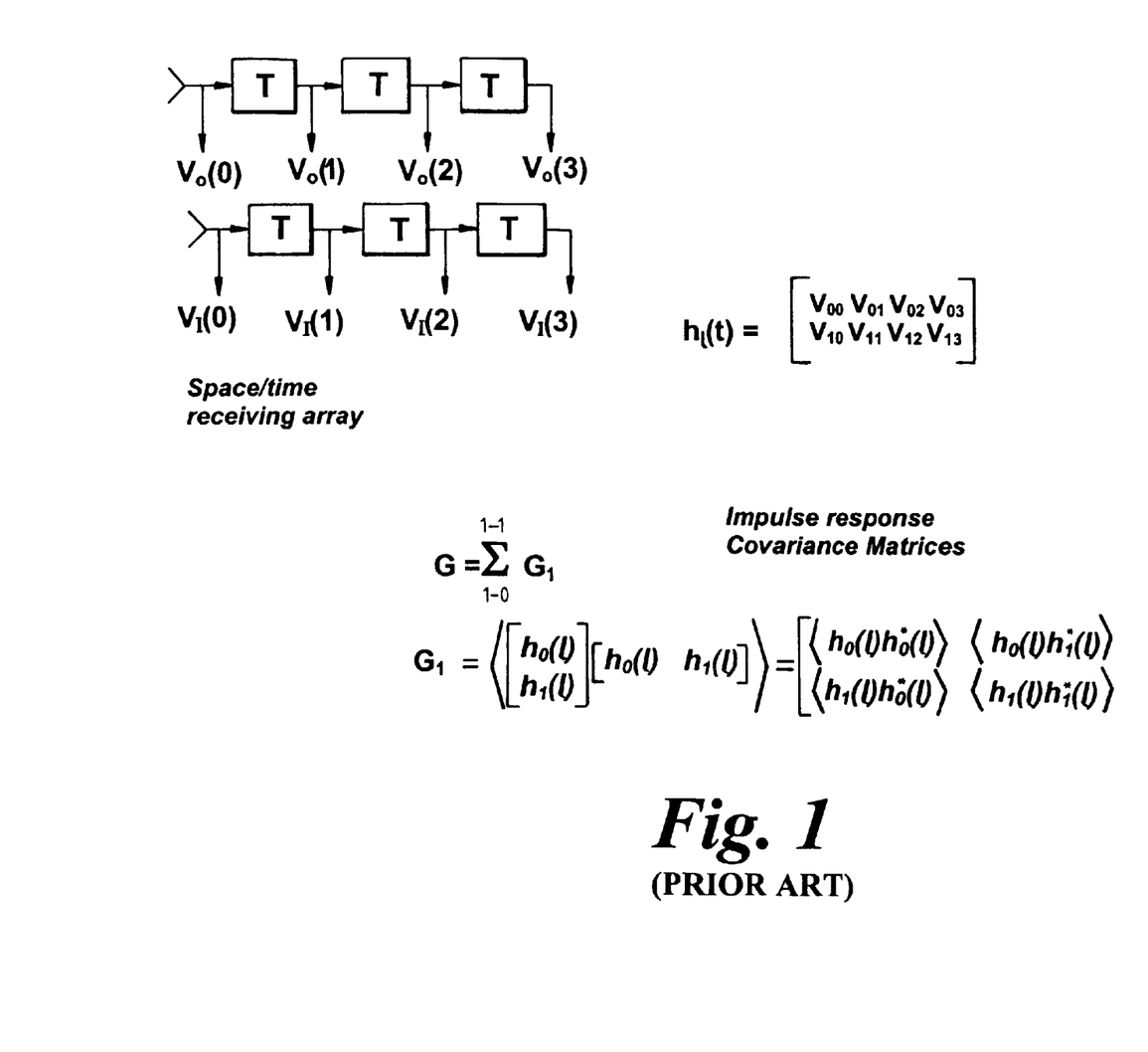
FIG. 1 is an algebraic representation of a prior art CDMA antenna array system.
Figure 2:
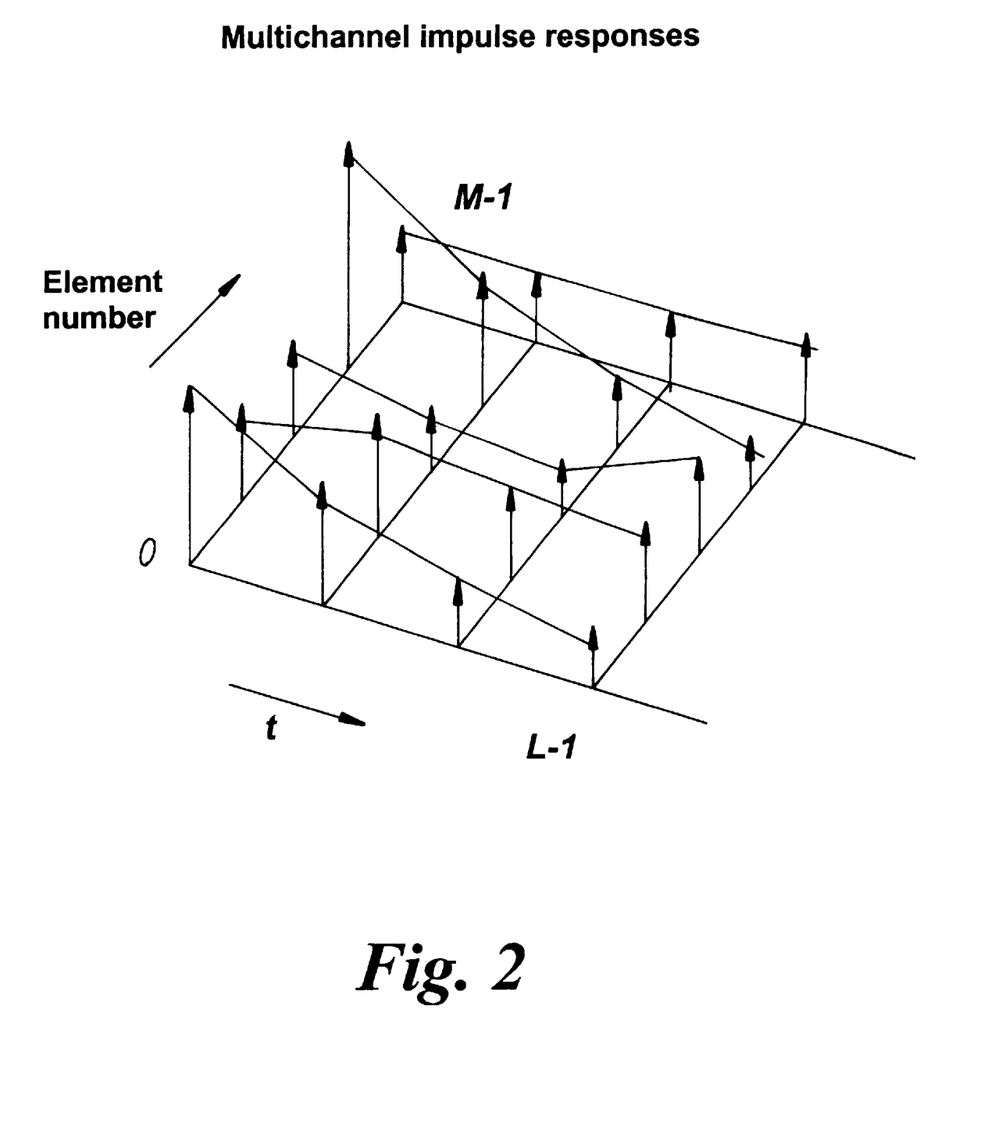
FIG. 2 is three dimensional graphical representation of a multichannel response.

FIG. 1 is an algebraic representation of a CDMA communications link. The vector d contains N consecutive binary data symbols for P users. When these symbols are transmitted, they are subject to multipath distortion. This causes the receiver to observe J versions of each transmitted symbol, which arrive at different times. This effect is defined mathematically by two matrices.

Multiplying d by the matrix T repeats each symbol J times. The size NPJ×NPJ matrix A is diagonal. Its diagonal elements are the positive square roots of the received multipath fading powers for the NP signals received on J paths. This results in the received signal being characterised as the product ATd. The size NPJ×NPJ matrix (R/L)D represents the combined effects of beamforming and of pseudo-noise coding and decoding, where L is the CDMA processing gain. The size NPJ×NPJ matrix R is Hermitian [Horn92, p169] (R. A. Horn and C. R. Johnson, "Matrix Analysis", Cambridge University Press, Cambridge (UK), 1992.) The size NPJ×NPJ matrix D is diagonal [Horn92, p23]. The quantity y=(R/L)DATd+z/L represents the processed received signal plus background noise (the size NPJ vector z/L).

Antenna array techniques have been proposed recently for improving the capacity of CDMA cellular systems as is described in "Smart antenna arrays for CDMA Systems" IEEE Personal Communications Magazine, Vol 3(5) pp 16–25, October 1996. Antenna arrays are readily deployed at the base station on the uplink (mobile-to-base station link), as the uplink channel can be estimated from the received waveforms. Using antenna arrays to retransmit on the downlink in a frequency division duplex (FDD) system is more difficult, as channel estimates are not directly available to the base station. However, in order to increase CDMA system capacity, it is important to provide performance improvements on both radio links, although the downlink has not been the subject of much interest with respect to antenna arrays.

Thus, several approaches to downlink beamforming have been proposed. One approach to downlink beamforming is to use channel estimates for each user from the uplink to select beam patterns and impulse responses to transmit on the downlink. Another approach includes the use of DOA algorithms, although, the length of the multipath channel increases, so that the mobile may require more RAKE fingers to track all the multipath components.

In a frequency non-selective channel, neither a maximum SNR method (to be described below) nor the constrained downlink beamforming technique (also to be described below) will provide diversity at the mobile.

In an environment where frequency non-selective channels are common, a transmitter diversity scheme, such as phase sweeping or multipath diversity may be required to ensure diversity at the mobile (e.g. G. W. Wornell and M. D Trott, "Efficient Signal Processing Techniques for Exploiting Transmit Antenna Diversity on Fading Channels", IEEE Trans Sig Proc, January 1997, Vol 45(1), pp 191–205).

OBJECT OF THE INVENTION

The present invention seeks to provide a simple to implement base station receiver structure which possesses improved symbol detection characteristics.

STATEMENT OF THE INVENTION

In accordance with a first aspect of the invention, there is provided a method of operating a FDD radio communications system wherein a base station has a constrained beamformer comprising at least two transmitting and receiving antennas, each with L channel taps and is operable to maximise diversity gain at the mobile, the steps comprising:

estimating the signal power for each tap on the uplink as:

$$\alpha_l = (w^H H(l) w)/(w^H w) G$$

whereby to perform a simple diversity check for the maximum SNR weight vector solution w;
determining how the transmit power is spread;
wherein, in the event that the transmit power is concentrated in one tap, such that significant diversity gain is lost, an alternative beamformer solution w is determined whereby equal gain is provided in the directions of all L channel taps. The total SNR of all the multipath components received at the mobile will be less than for the maximum SNR algorithm, but the diversity gain should outweigh this loss for (nearly) orthogonal channel taps. The transmitter is restricted to using a single set of transmitter weights.

Preferably the L matrices G(l) are subject to eigenvalue decompositions to determine the L corresponding principal eigenvectors $v_l$. The transmitter is restricted to using a single set of transmitter weights.

The weight vector solutions can be considered as determined by the following equation:

$$w = V(V^H V)^{-1} f$$

wherein the lth column of the size L×M matrix V is the eigenvector $v_l$; and, f is the size L×1 constraint vector.

The weight vector solutions can be considered as determined by the following equation:

$$w = Vf$$

wherein the lth column of the size L×M matrix V is the eigenvector $v_l$; and, f is the size L×1 constraint vector.

The performance of an uplink fixed weight beamformer is determined from the correlation matrix of the fadings of the uplink sampled impulse response.

BRIEF DESCRIPTION OF THE FIGURES

In order that the present invention can be more fully understood and to show how the same may be carried into effect, reference shall now be made, by way of example only, to the Figures as shown in the accompanying drawing sheets wherein.

DETAILED DESCRIPTION OF THE PREFERRED EMBODIMENTS

There will now be described, by way of example, the best mode contemplated by the inventors for carrying out the invention under multipath and single path conditions. In the following description, numerous specific details are set out in order to provide a complete understanding of the present invention. It will be apparent, however, to those skilled in the art, that the present invention may be put into practice with variations of the specific.

A single active CDMA user corrupted by spatially and temporally white Gaussian noise can be simply modelled. The desired user's uplink channel consists of L resolvable multipath components and is received by an M-element antenna array at the base station. The M×1 baseband vector output from the array at time t may be written as:

$$y(t) = \sum_{l=1}^{L} d(t - [l-1]T_c) h_l(t) + v(t)$$

The notation $h_l(t)$ is the M×1 channel vector for the lth channel tap; v(t) is an additive white Gaussian noise vector. The sequence d(t) is the user's k th binary data symbol s(k), multiplied by the random binary code sequence c(t). Finally $T_c$ denotes the chip period of the CDMA code. In order to process the vector y(t), it may be sampled at the chip rate. Typically on the uplink, the base station will correlate the vector y(n) with the user's spreading sequence c(t) to extract the data signal whilst suppressing noise and interference. The lth multipath component of the user's k th symbol is obtained as:

$$x(l,k) = \sum_{i=1}^{W} y([k-1]W + l + i) c([k-1]W + i)$$

where a discrete time index has been used for the CDMA code chips c(n). The notation W denotes the CDMA processing gain and is equal to the ratio $T_s/T_c$ where $T_s$ is the symbol period. The receiver must now estimate the channel vectors $h_l(n)$ to combine the multipath components in space and time.

The channel vectors $\{h_l\}$ are modelled using the Gaussian wide sense stationary uncorrelated scattering approach. In this case, each channel vector is the sum of a number of equal amplitude plane waves:

$$h_l(t) = \sqrt{(\rho_l/Q)} \sum_{q=1}^{Q} \exp\{j(\phi_q + 2\pi v_q t)\} a(\theta_q)$$

where $\rho_l$ is the lth tap power and $\phi_q$, $v_q$ and $\theta_q$ are the phase, Doppler frequency and bearing of the qth component. Typically, the maximum Doppler frequency is much lower than the data rate of the CDMA system, so that the channel vectors $h_l$ are constant over one symbol. The scalar Q denotes the number of plane waves that comprise $h_l$ and the vector $a(\theta)$ is the array steering vector for the uplink frequency. Assuming that the receiver contains a uniform linear antenna array with element spacing D, the normalised steering vector may be written as:

$$a(\theta) = \frac{1}{\sqrt{M}} [1, \exp\{j(2\pi D/\lambda_u)\sin(\theta)\}, \ldots, \exp\{j(2\pi(M-1)D/\lambda_u)\sin(\theta)\}]^T$$

where $\lambda_u$ is the uplink carrier wavelength.

The antenna for each 120° sector of the base station modelled is a single duplex uniform linear antenna array, for receive and transmit operations. The antenna spacing is $D=\lambda_m/2$, where $\lambda_m=(\lambda_u+\lambda_d)/2$. Using the principle of reciprocity to model the downlink channel simplifies the situation, whereby the vector downlink channel to the mobile is the same as that observed at the base station when the mobile transmits on the downlink frequency.

Figure 3:
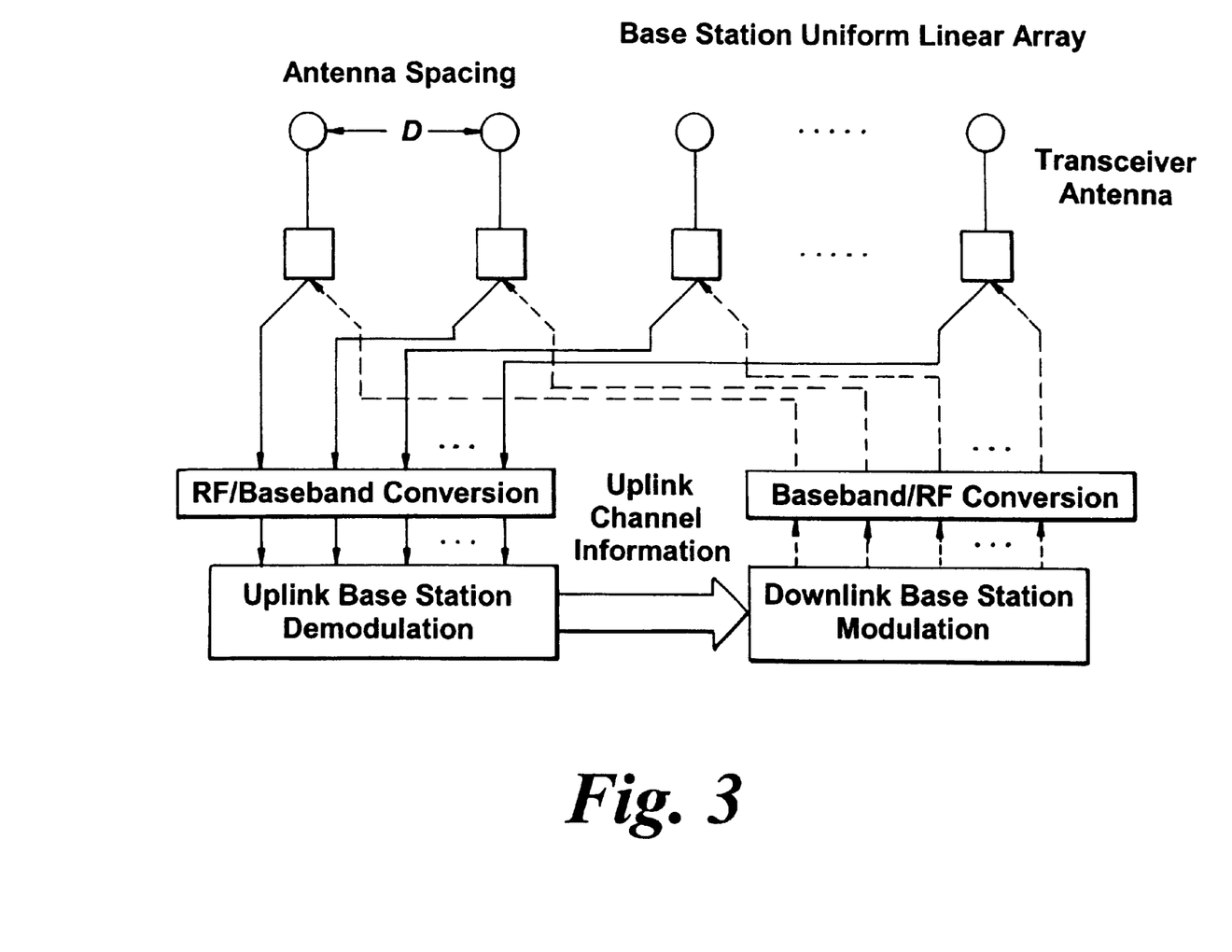
FIG. 3 shows a two element three tap antenna array receiver.
Figure 4:
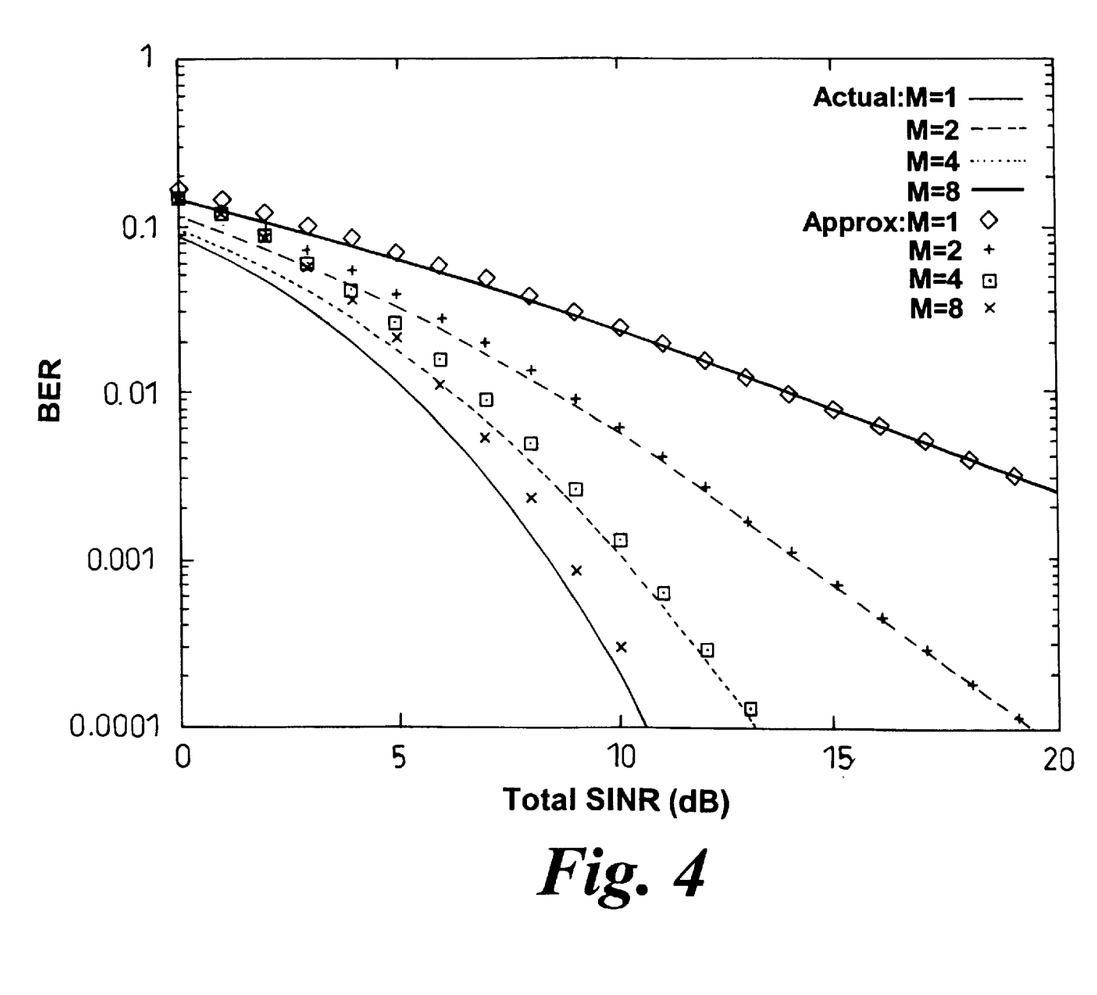
FIG. 4 shows a four element uniform linear antenna array.

Referring now to FIG. 3, there is shown a graphical representation of a multi-channel uplink response as would be received by an antenna array of a telecommunications base station. FIG. 4 shows a uniform linear antenna array as may be employed by such a telecommunications base station.

The observed downlink channel at the base station $\{gl(t), l=1 \ldots L\}$ may be modelled using the following assumptions:

(a1) The bearings $\theta_q$ of the Q components comprising the channel vector pairs $\{l, g\}$ are the same.

(a2) The frequency translation between the uplink and downlink means that the steering vector of the antenna array on the downlink frequency, denoted as $d(\theta)$ is not the same as $a(\theta)$.

(a3) Frequency dependent variations in the Doppler frequencies $\{v_q\}$ and the power levels $\{\rho_l\}$ will be neglected.

(a4) The downlink is assumed to be outside the correlation bandwidth of the uplink channel. The carrier phases $\phi_q$ on the downlink will be uncorrelated with those on the uplink.

The effect of these assumptions is that the uplink and downlink channels are instantaneously uncorrelated, i.e. that $E[gl^H(t) h_l(t)]=0$. However, the M×M mean covariance matrix of $g_l$, denoted as G(l), will be approximately equal to H(l). The difference between the two matrices will depend on the difference between the steering vectors $a(\theta)$ and $d(\theta)$.

This is in turn a function of the FDD frequency translation, relating to the centre carrier frequency of the uplink.

In the case of a single user case, where the base station selects a single M×1 weight vector w to transmit to the mobile. The base station is assumed to provide a pilot signal or periodic training sequences as part of its transmission to the mobile, to permit coherent demodulation. Assumption (a4) above indicates that instantaneous uplink channel measurements may not provide a good indication of the downlink channel. Instead, the algorithms described exploit the fact that the average statistics of the both channels will be approximately the same.

Once a weight vector has been selected, the mean signal power received by the mobile for the lth tap is given by $Pw^H G(l) w$, assuming that the beamformer has unit norm (i.e. $w^H w=1$). The scalar P denotes the total transmit power available for each mobile. If the noise power is $\sigma^2$, the SNR of the lth tap is $\gamma_i(l)=(P/\sigma^2) w^H G(l) w$. Each tap that is resolved at the mobile by a RAKE finger fades according to the Rayleigh distribution. For coherent phase shift keying modulation, the mean BER is given by:

$$BER = \frac{1}{2}\sum_{k=1}^{L}\left(\prod_{\substack{l=1\\l\neq k}}^{L} \frac{\gamma_i(k)}{\gamma_i(k)-\gamma_i(l)}\right)\left[1-\sqrt{\frac{\gamma_i(k)}{1+\gamma_i(k)}}\right]$$

Since all scalars $\gamma_i(k)$ are unequal, the BER of the mobile receiver will depend on both the total signal power received and the diversity gain available.

An M×1 vector w must be selected for the base station in order to maximise the SNR in the case of a single user, to satisfy the following relation:

$$SNR = \frac{Pw^H Gw}{\sigma^2} \quad \text{where} \quad G = \sum_{l=1}^{L} G(l)$$

The solution to this optimisation problem is to choose $w=u_1$, where $u_1$ is the principal eigenvector of the matrix G. In practice, however, the receiver only has access to the uplink matrix H, the sum of the uplink covariance matrices H(l).

In the case where the L uplink channel taps are a set of array steering vectors $\{a(\theta)\}$, then the angular spread $\Delta$ becomes 0, and the matrix H may then be decomposed as:

$$H = \sum_{l=1}^{L} H(l) = \sum \rho_l a(\theta_l) a^H(\theta_l)$$

In some cases, all the steering vectors will overlap, whereby the resulting weight w is correlated with all L channel taps. However, if all L steering vectors are orthogonal, the above equation shows that they constitute the eigenvectors of the rank space of the matrix G, with eigenvalues. Therefore, the maximum SNR algorithm will simply pick the largest eigenvector which results in a flat-fading channel at the mobile. The loss of multipath diversity for the (L−1) other channel taps will cause significantly poorer performance at the mobile. Worse, if the largest eigenvalue has a multiplicity greater than one, the eigenvector solution will occupy a spherical subspace and the maximum SNR algorithm does not provide a unique weight vector solution.

One mitigating factor in this case is actually due to the FDD shift between uplink and downlink. A set of channel tap steering vectors which are orthogonal on the uplink will not be completely orthogonal on the downlink due to the change in steering vector between links. However, even in this case, the correlation between the largest channel tap weight vector w and the other (L−1) taps will still be small. A second point is that in the case of wider angular spread (i.e. $\Delta>0$), each covariance matrix G(l) will have multiple eigenvalues and eigenvectors. In this case, it is more likely that the chosen weight vector w will be partially correlated with all L channel taps. However, if the L principal eigenvectors obtained from the L matrices $\{G(l)\}$ are orthogonal, a significant loss in diversity gain will again occur.

The loss in performance due to orthogonal or nearly-orthogonal channel vectors is unacceptable in many cases. The orthogonality condition is more likely to arise for larger array sizes M, when a pair of orthogonal steering vectors arise with only a small angular displacement.

In one embodiment, the invention provides a constrained beamformer which seeks to maximise diversity gain at the mobile. Firstly, a simple diversity check is performed for the maximum SNR weight vector solution w by estimating the signal power for each tap as: $\alpha=(w^H H(l)w)/(w^H w) G$. If the transmit power is concentrated in one tap, so that significant diversity gain is lost, an alternative beamformer solution w can be used which has equal gain in the directions of all L channel taps. The total SNR of all the multipath components received at the mobile will be less than for the maximum SNR algorithm, but the diversity gain should outweigh this loss for (nearly) orthogonal channel taps. The transmitter is restricted to using a single set of transmitter weights.

Initially, the L matrices G(l) are subject to eigenvalue decompositions to determine the L corresponding principal eigenvectors $V_l$. Two possible weight vector solutions shall be considered:

(a)

$$w=V(V^H V)^{-1}f$$

(b)

$$w=Vf$$

The l th column of the size L×M matrix V is simply the eigenvector $V_l$ and f is the size L×1 constraint vector. In this case, f is the all ones vector. Under the condition that the eigenvectors $\{V_l\}$ are orthogonal, methods (a) and (b) become equivalent. Once a beamformer has been selected, using either method, the signal power levels at each tap may be evaluated in the same manner as for the maximum SNR method. Evaluating the BER equation for different SNR levels permits the required SNR for a given BER target to be determined. This provides a realistic measure of how the beamformers compare.

Referring again to FIG. 4, a uniform linear antenna array of a telecommunications base station receives signals from an outstation (only one is shown for reasons of clarity) within the area of coverage of the base station. By reason of the frequency offset between the uplink and downlinks in such a system the uplink propagation path does not equate exactly to the downlink propagation path when there is multipath so that it is not possible to have a phase coherent downlink weighting of the transmitter elements. Such a system is possible for TDD systems where the uplink and downlink are on the same channel and the propagation measured on the uplink can be turned around, phase reversed, and used for the downlink.

In lieu of the optimum coherent solution, a statistical solution is used which is the optimum fixed-weight downlink beamformer. This does not attempt to track the fast fading of the channel at all but does make the reasonable assumption that while the fast uplink and downlink fadings are uncorrelated, nevertheless their statistical structure bears a strong resemblance to the extent that the inter-tap correlation matrices of the uplink and downlink fadings should be very similar. This implies that if the optimum fixed-weight uplink beamformer can be found from the channel impulse response correlation matrix, then the optimum fixed-weight downlink beamformer should be the same. The performance of an uplink fixed weight beamformer is determined from the correlation matrix of the fadings of the uplink sampled impulse response.

The uplink sampled impulse response is an M×L matrix (M antenna elements, impulse response is L taps long in time) and is fixed by the multipath present in the channel. This matrix fluctuates with the fast fading. In alternative an notation this is the matrix $h_l(t)$ where $h_l$ is a set of L vectors each with M elements.

It can be shown that the received power at a mobile, after it has performed a matched filtering RAKE operation on a single time-invariant channel received signal with channel impulse response $h_l$, $l=0, \ldots, L-1$ is $$P = \sum_{l=0}^{L-1} |h_l|^2$$

which happens to be the same as the total received power.

If there are multiple downlink channels with channel impulse responses $h_l(k)$, $l=0, \ldots, L-1$, $k=0, \ldots, M$ the power then a coherent addition can be performed across the channels first, and then the previous equation can be applied. If these channels are weighted at the transmitter with weights $w(k)$ then we would get $$P = \sum_{l=0}^{L-1} |W^H h_l|^2$$

In the time varying, fading case we have $h_l(t)$ is a function of time due to fading. Taking an average of the previous equation yields $$P = \left\langle \sum_{l=0}^{L-1} |W^H h_l|^2 \right\rangle = \left\langle \sum_{l=0}^{L-1} W^H h_l h_l^H W \right\rangle$$

$$= \sum_{l=0}^{L-1} W^H \langle h_l h_l^H \rangle W$$

$$= \sum_{l=0}^{L-1} W^H H_l W$$

A number of simulations have been conducted to compare the algorithms discussed above. Although the constrained beamformer solutions have been proposed for the specific case of orthogonal channel taps, their performance were measured for a range of channels to compare with the maximum SNR approach. The performance metric used is the total required SNR at the mobile for it to achieve a mean BER of 1% This quantity is proportional to the transmitter power required at the base station and indicates the performance gains of the different beamforming techniques. An uplink/downlink frequency translation of 4% of the uplink carrier frequency and an antenna array size of M=4 has been modelled, with FIG. 4 showing a representation of uniform array.

Figure 5:
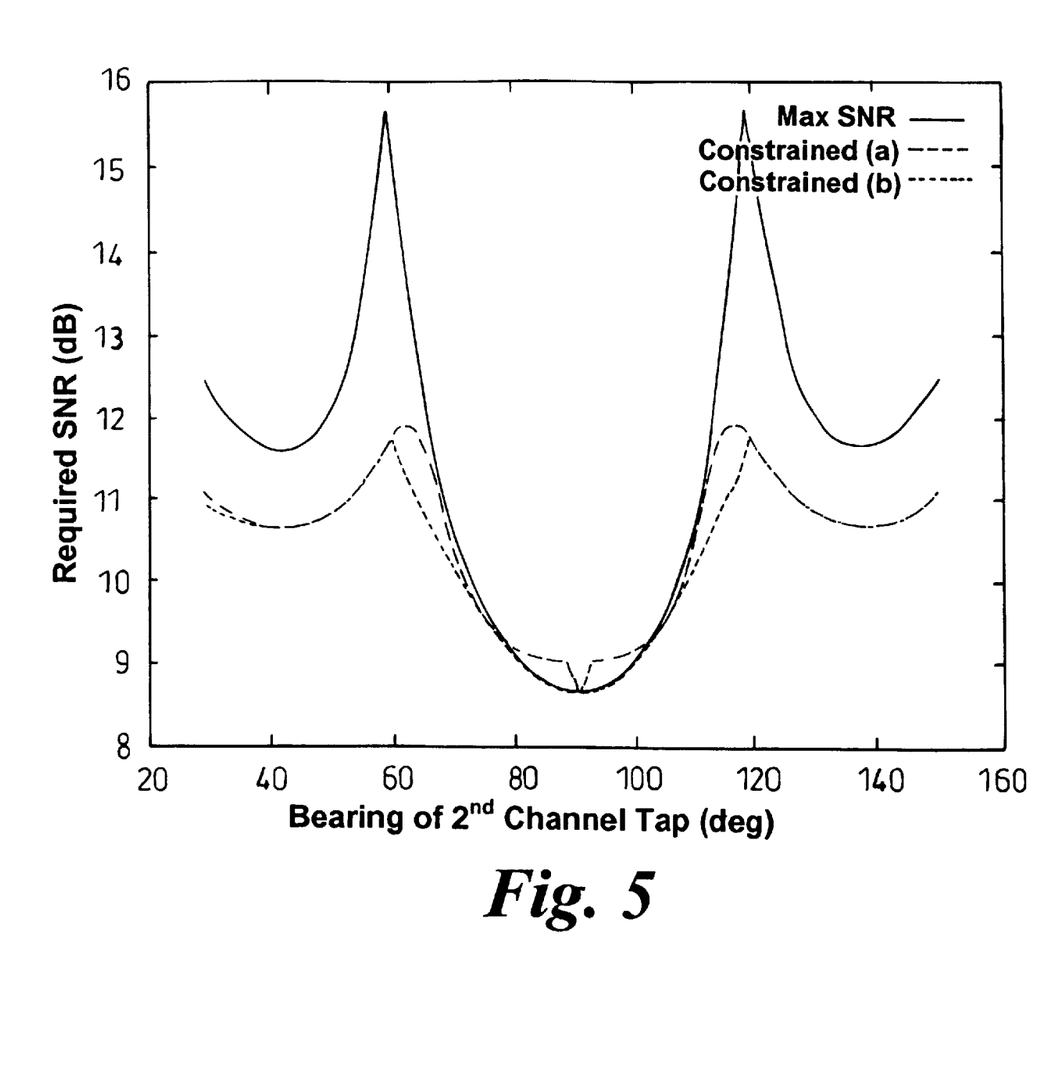
FIG. 5 shows the required SNR for three algorithms as a function of the bearing $\theta_2$ of the second tap, angular spread, $\Delta=0°$.

The first simulation considers a simple two tap channel model, with mean powers 1 and 0.5. The angular spread $\Delta=0°$ and the bearing $\theta_1$ of the stronger tap is set to 90° (the array broadside). The bearing $\theta_2$ of the weaker tap is then varied to assess its effect on the different algorithms. The results for the three algorithms are shown in FIG. 5. All the algorithms provide similar performance when $\theta_2$ is close to 90°. However, as the separation of $\theta_1$ and $\theta_2$ increases, the performance of the maximum SNR algorithms begin to degrade compared to the two constrained beamformer solutions. When $\theta_2 = 60°$, 120°, the associated steering vectors are orthogonal and both the DOA and maximum SNR methods provide almost a flat-fading channel at the mobile. By splitting the transmit power between the two taps, the constrained beamformer provides diversity gain and there is a 3.5 dB reduction in required SNR. Both constrained beamformers provide a clear performance improvement in this case.

Figure 6:
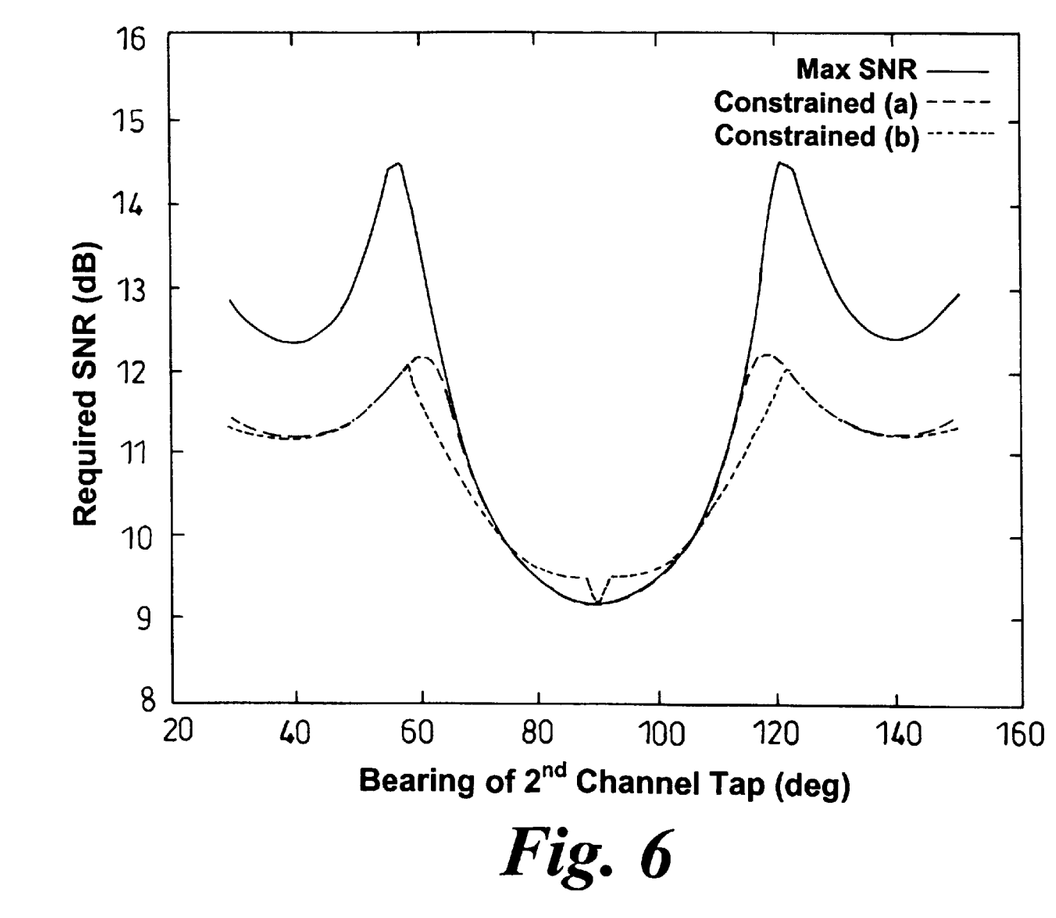
FIG. 6 shows the required SNR for three algorithms as a function of the bearing $\theta_2$ of second tap angular spread, $\Delta=30°$.

The second simulation is identical to the first, except that A has been increased to 30° for both channel taps. The SNR requirements of the three algorithms in this case are shown in FIG. 6. Compared to FIG. 5 the SNR levels are higher. This is because the beamformers do not illuminate all the multipath components due to the wider angular spread. The maximum SNR method again degrade around $\theta_2 = 60°$, 120°, though the performance loss is smaller, at around 2–2.5 dB for this case.

Figure 7:
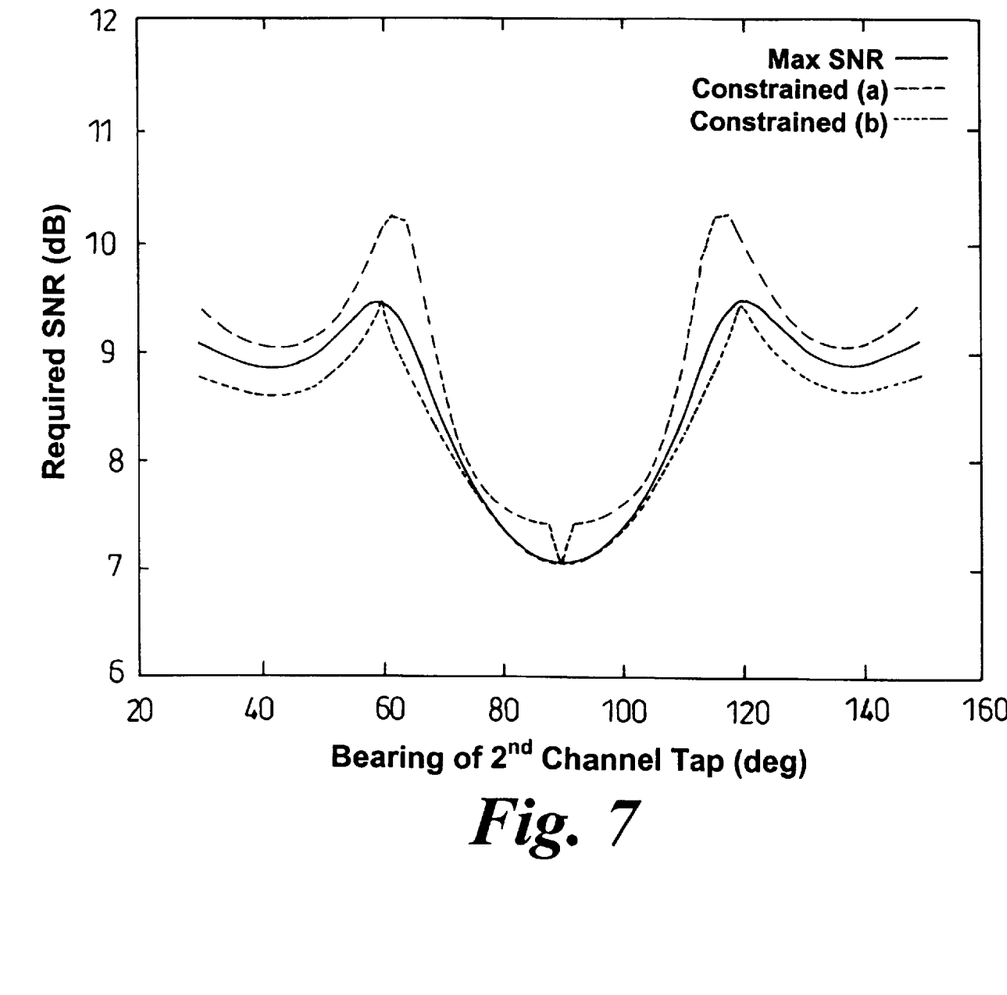
FIG. 7 shows the required SNR for three algorithms as a function of the bearing $\theta_2$ of the second tap, $\Delta=0$ and a third tap having a bearing of 90°; and, FIG. 8 shows the BER and constrained beamformer algorithms in the presence of two orthogonal taps, where the power of the second tap relative to the first.

The third simulation shows a case similar to the first simulation, except that a third tap is added, with power 0.9, bearing 90° and angular width $\Delta=0°$. The performance curves are shown in FIG. 7. In this case, reasonable performance gain is achieved by transmitting power in the direction of the first and third taps, regardless of the bearing $\theta_2$ of the weakest tap. In particular, when $\theta_2 = 60°$, 120°, the constrained beamformer attempts to transmit power in the direction of all three taps, but the diversity benefit is cancelled out by having to split power between two different bearings. There is little to choose between the performance of any of the algorithms. These results show that when the maximum SNR algorithm can provide some diversity gain, the constrained beamformer solutions are less likely to provide substantial performance improvements.

Figure 8:
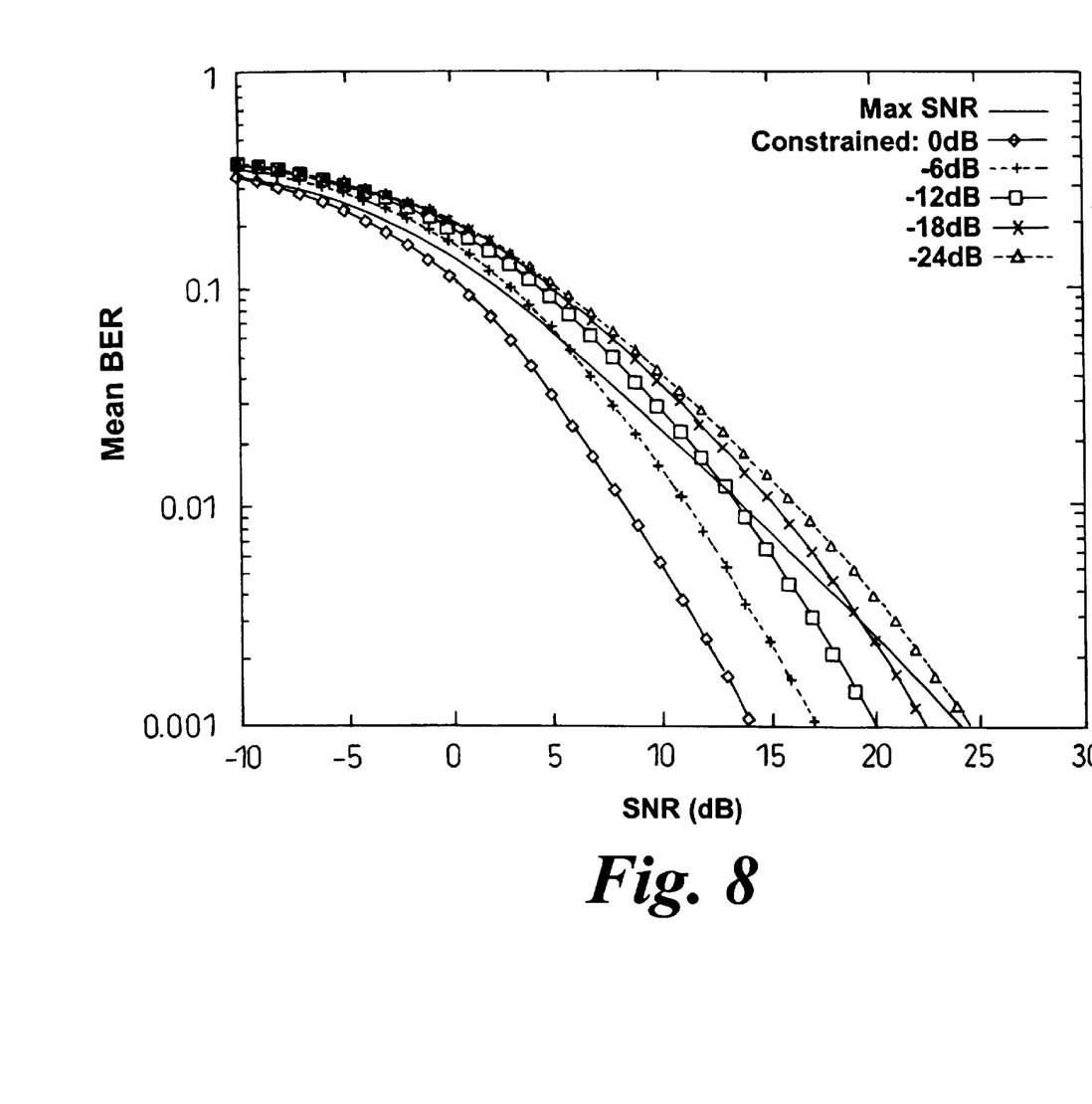

Finally, the two tap scenario of the first simulation is again considered. This time the two taps are set to be orthogonal, with bearings 90° and 60°, and the power of the second tap is varied from 0 dB to −24 dB with respect to the power of the first tap. This time, the uplink/downlink frequency shift is neglected. The maximum SNR algorithm transmits full power in the direction of the first tap, whilst the constrained beamformer approach splits power equally between the two taps. The BER performance of the maximum SNR algorithm is always the same and is shown in FIG. 8 along with curves for the constrained beamformer with different power levels for the second tap. As the power of the second tap reduces, the BER performance of the constrained beamformer approach gets worse because of the reduced diversity gain. For a power level of −12 dB for the second tap, both algorithms yield roughly the same SNR for a BER of 1%. These results indicate that the constrained beamformer must select channel taps carefully. The lower the power of a channel tap, the higher the SNR before it provides useful diversity gain.

The technique for performing downlink beamforming in a CDMA system are applicable to frequency selective fading channels and result in a single set of transmit weights for a desired user's waveform. The maximum SNR method provides reasonable performance in most scenarios, but can degrade in the case of orthogonal channel taps. A constrained beamformer technique has been proposed, which can ensure that some power is transmitted to all the major downlink channel taps. This algorithm can be used, when the performance of the maximum SNR approach is found to be inadequate.

Referring again to FIG. 4, a uniform linear antenna array of a telecommunications base station receives signals from an outstation (only one is shown for reasons of clarity) within the area of coverage of the base station. By reason of the frequency offset between the uplink and downlinks in such a system the uplink propagation path does not equate exactly to the downlink propagation path when there is multipath so that it is not possible to have a phase coherent downlink weighting of the transmitter elements. Such a system is possible for TDD systems where the uplink and downlink are on the same channel and the propagation measured on the uplink can be turned around, phase reversed, and used for the downlink.

In lieu of the optimum coherent solution, a statistical solution is used which is the optimum fixed-weight downlink beamformer. This does not attempt to track the fast fading of the channel at all but does make the reasonable assumption that while the fast uplink and downlink fadings are uncorrelated, nevertheless their statistical structure bears a strong resemblance to the extent that the inter-tap correlation matrices of the uplink and downlink fadings should be very similar. This implies that if the optimum fixed-weight uplink beamformer can be found from the channel impulse response correlation matrix, then the optimum fixed-weight downlink beamformer should be the same. The performance of an uplink fixed weight beamformer is determined from the correlation matrix of the fadings of the uplink sampled impulse response.

What is claimed is:

1. A method of operating a FDD radio communications system wherein a base station has a constrained beamformer comprising at least two antennas with L channel taps and is operable to maximise diversity gain at the mobile, the steps comprising:

estimating the signal power for each tap as: $\alpha_l = (w^H H(l) w)/(w^H w) \, G$ whereby to perform a simple diversity check for the maximum SNR weight vector solution w;

determining how the transmit power is spread;

wherein, in the event that the transmit power is concentrated in one tap, such that significant diversity gain is lost, an alternative beamformer solution w is determined whereby equal gain is provided in the directions of all L channel taps.

2. A method according to claim 1 wherein the L matrices G(l) are subject to eigenvalue decompositions to determine the L corresponding principal eigenvectors $v_i$.

3. A method in accordance with claim 1 wherein the weight vector solutions shall be considered as determined by the following equation:

$$w = V(V^H V)^{-1} f$$

wherein the lth column of the size L×M matrix V is the eigenvector $v_i$; and, f is the size L×1 constraint vector.

4. A method in accordance with claim 1 wherein the weight vector solutions shall be considered as determined by the following equation:

$$w = Vf$$

wherein the lth column of the size L×M matrix V is the eigenvector $v_i$; and, f is the size L×1 constraint vector.

5. A system in accordance with claim 1 wherein the transmitter is restricted to using a single set of transmitter weights.

* * * * *